R. B. Wright.
Seed-Planter.
Nº 75616. Patented Mar. 17, 1868.

Witnesses:
H. C. Ashkettle
J. A. Fraser

Inventor:
R. B. Wright

United States Patent Office.

R. B. WRIGHT, OF VERMILLION, ILLINOIS.

Letters Patent No. 75,616, dated March 17, 1868.

IMPROVEMENT IN SEED-PLANTERS.

*The Schedule referred to in these Letters Patent and making part of the same.*

TO ALL WHOM IT MAY CONCERN:

Be it known that I, R. B. WRIGHT, of Vermillion, in the county of Edgar, and State of Illinois, have invented a new and improved Seed-Planter; and I do hereby declare that the following is a full, clear, and exact description thereof, which will enable others skilled in the art to make and use the same, reference being had to the accompanying drawings forming part of this specification.

This invention relates to a new and useful improvement in a seed-planter, for which Letters Patent were granted to me, bearing date February 26, 1867.

The present invention consists in a new and improved manner of operating the seed-slides, arrangement of driver's seat, wheels, and a chain-stop, all of which are hereinafter fully shown and described, whereby several advantages are obtained over the original patented machine. In the accompanying sheet of drawings—

Figure 1:
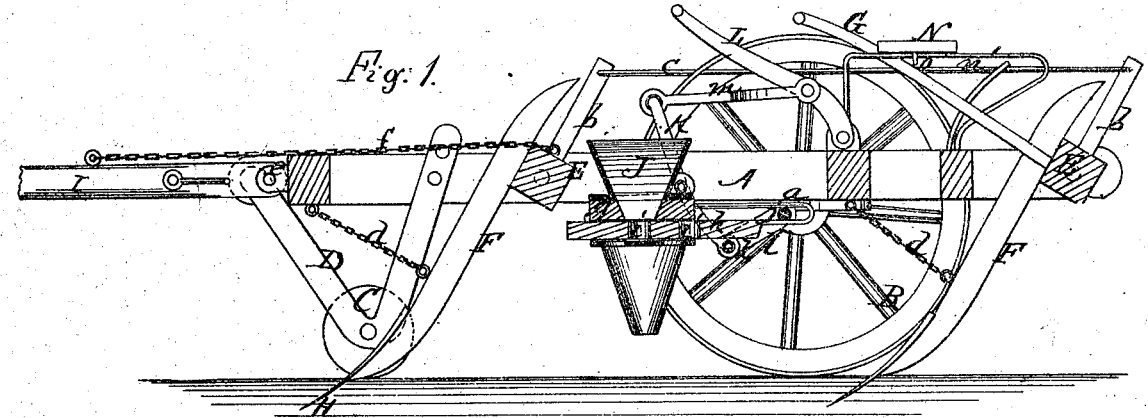
Figure 2:
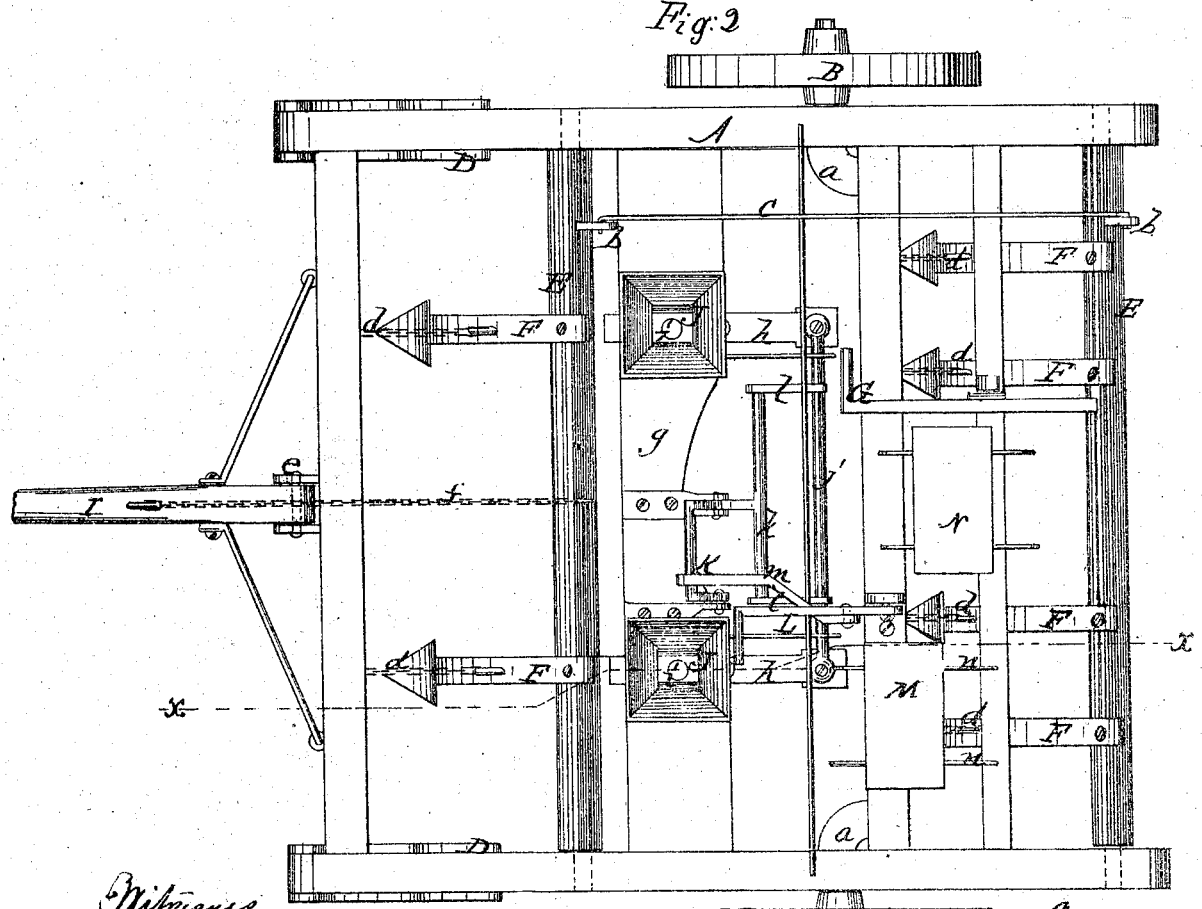

Figure 1 is a side sectional view of my invention, taken in the line $x$ $x$, fig. 2.

Figure 2, a plan or top view of the same.

Similar letters of reference indicate corresponding parts.

A represents the frame of the machine, which is of rectangular form, and mounted on four wheels, B B, C C, the two former, B B, being much the largest, and having their arms, $a$ $a$, attached to the under side of the frame A, the two smaller wheels, C C, having their axles in metallic brackets, D, attached to the sides of the frame A, as shown clearly in fig. 1. In the frame A there are placed, transversely, two shafts, E E, which are allowed to turn freely in the frame. These shafts have standards, F, attached, two being attached to the front shaft and four to the rear shaft, each shaft having an arm, $b$, extending upward from it, and the upper ends of the arms connected by a rod, $c$. The rear shaft, E, has a lever, G, attached, by actuating which the shovels H, at the lower ends of the standards, may be raised out of the ground when necessary. The standards are prevented from being forced back beyond a certain distance by chains $d$, secured to the frame A and to the standards F, as shown in fig. 1. I is the draught-pole, attached to the front of frame A by a joint or hinge, $e$. This draught-pole is connected by a chain, $f$, with the front shaft, E. J J are two seed-boxes, placed on a cross-bar, $g$, of frame A, and having each a seed-slide, $h$, working underneath them. These slides are perforated each with two holes, $i$ $i$, and the rear ends of the slides are connected by a rod, $j$, to which a rod, $k$, parallel with $j$, is connected by two links, $l$ $l$. The rod $k$ is attached to the lower end of a yoke, K, which is pivoted on the frame A, and the upper end of the yoke is connected by a link, $m$, to a lever, L, on frame A, which lever is in convenient reach of the dropper on seat M. This seat M is fitted on two rods, $u$ $u$, in such a manner that it may slide freely forward and backward thereon, the under side of the seat having eyes, $o$, attached, which are fitted on the rods $n$ $n$. The driver's seat, N, is arranged in a similar manner on rods $n$. The seed-slides are operated by the dropper on seat M, who actuates the lever L.

As the machine is drawn along, the front shovels, H, open the furrows, the seed being dropped into the latter by the dropper actuating the lever L. The rear shovels, H, cover the seed. In turning at the ends of rows, the driver and dropper move back their seats on the rods on which they rest, and the weight of the driver and dropper causes the front end of the frame to tilt up, so that the weight of the machine will be supported by the rear wheels, B B, and the machine readily turned, the chain $f$ limiting the upward tilting movement of the frame.

I claim as new, and desire to secure by Letters Patent—

1. The connecting of the seed-slides $h$ $h$ by a rod, $j$, which is attached to a rod, $k$, parallel with $j$, by links $l$ $l$, and the connecting of the rod $k$ to a swinging or pivoted yoke, K, which is actuated by the dropper through the medium of a lever, L, all constructed and arranged to operate in the manner substantially as and for the purpose set forth.

2. The sliding or adjustable seats M N, in combination with the two pairs of wheels B B, C C, all arranged substantially in the manner as and for the purpose specified.

3. The connecting of the draught-pole I to the frame A by a chain, $f$, in addition to the usual joint $e$, for the purpose of limiting the upward tilting movement of the front part of the frame, substantially as set forth.

The above specification of my invention signed by me, this 23d day of December, 1867.

R. B. WRIGHT.

Witnesses:
    ALEXANDER STUBBS,
    J. H. WRIGHT.